United States Patent
Kim et al.

(10) Patent No.: US 9,564,628 B2
(45) Date of Patent: Feb. 7, 2017

(54) COMPOSITE CATHODE ACTIVE MATERIAL, AND CATHODE AND LITHIUM BATTERY EACH USING THE SAME

(75) Inventors: Ji-Hyun Kim, Yongin-si (KR);
Do-Hyung Park, Yongin-si (KR);
Seon-Young Kwon, Yongin-si (KR);
Min-Han Kim, Yongin-si (KR);
Joong-Ho Moon, Yongin-si (KR);
Kyoung-Hyun Kim, Yongin-si (KR);
Han-Eol Park, Yongin-si (KR);
Ki-Hyun Kim, Yongin-si (KR);
Ming-Zi Hong, Yongin-si (KR);
Myong-A Woo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 624 days.

(21) Appl. No.: 13/610,599

(22) Filed: Sep. 11, 2012

(65) Prior Publication Data

US 2013/0302685 A1      Nov. 14, 2013

(30) Foreign Application Priority Data

May 8, 2012   (KR) .......................... 10-2012-0048823

(51) Int. Cl.
*H01M 4/525*   (2010.01)
*H01M 4/136*   (2010.01)
*H01M 4/58*    (2010.01)
*H01M 4/1315*  (2010.01)
*H01M 4/36*    (2006.01)
(Continued)

(52) U.S. Cl.
CPC ........... *H01M 4/1315* (2013.01); *H01M 4/362* (2013.01); *H01M 4/485* (2013.01); *H01M 4/505* (2013.01); *H01M 4/525* (2013.01); *H01M 10/0587* (2013.01); *H01M 4/366* (2013.01);
(Continued)

(58) Field of Classification Search
USPC .............................................. 429/221–231.95
See application file for complete search history.

(56) References Cited

U.S. PATENT DOCUMENTS

2006/0257745 A1 * 11/2006 Choi ...................... B82Y 30/00
                                                          429/231.3
2006/0263691 A1    11/2006 Park et al.
(Continued)

FOREIGN PATENT DOCUMENTS

JP    2000-82466 A    3/2000
JP    2006-318926 A   11/2006
(Continued)

OTHER PUBLICATIONS

Korean Office Action dated Jan. 30, 2016 for Korean Patent Application No. KR 10-2012-0048823 which corresponds to subject U.S. Appl. No. 13/610,599.
(Continued)

*Primary Examiner* — Ula C Ruddock
*Assistant Examiner* — Osei Amponsah
(74) *Attorney, Agent, or Firm* — Knobbe Martens Olson & Bear LLP

(57) ABSTRACT

In one aspect, a composite cathode active material including at least one large-diameter active material, and at least one small-diameter active material, a cathode including the composite cathode active material and a lithium battery including the cathode is provided.

18 Claims, 2 Drawing Sheets

(51) Int. Cl.
H01M 4/485 (2010.01)
H01M 4/505 (2010.01)
H01M 10/0587 (2010.01)
H01M 4/02 (2006.01)

(52) U.S. Cl.
CPC ....... *H01M 2004/028* (2013.01); *Y02E 60/122* (2013.01)

(56) References Cited

U.S. PATENT DOCUMENTS

| | | |
|---|---|---|
| 2010/0019208 A1 | 1/2010 | Choi et al. |
| 2010/0081055 A1 | 4/2010 | Konishi et al. |

FOREIGN PATENT DOCUMENTS

| | | |
|---|---|---|
| KR | 10-2004-0026378 A | 3/2004 |
| KR | 10-2005-0030899 A | 3/2005 |
| KR | 10-2006-0091486 A | 8/2006 |
| KR | 10-2006-0112823 A | 11/2006 |
| KR | 10-2010-0036929 A | 4/2010 |
| KR | 10-2011-0063376 A | 6/2011 |

OTHER PUBLICATIONS

Korean Registration Determination Certificate dated Sep. 28, 2016 for Korean Patent Application No. KR 10-2012-0048823 and from which subject U.S. Appl. No. 13/610,599 claim priority.

\* cited by examiner

COMPOSITE CATHODE ACTIVE MATERIAL, AND CATHODE AND LITHIUM BATTERY EACH USING THE SAME

CROSS-REFERENCE TO RELATED APPLICATION

This application claims the benefit of Korean Patent Application No. 10-2012-0048823, filed on May 8, 2012, in the Korean Intellectual Property Office, the disclosure of which is incorporated herein in its entirety by reference.

BACKGROUND

Field

One or more embodiments relate to a composite cathode active material, and a cathode and a lithium battery each including the composite cathode active material.

Description of the Related Technology

Lithium batteries with high voltage and high-energy density have a wide range of applications. In the field of electric vehicles such as hybrid electric vehicles (HEV) and plug-in hybrid electric vehicles (PHEV), lithium batteries with high-energy density and high thermal stability that are operable at high temperatures with long lifetime and capable of charging or discharging a large amount of electricity are required.

To improve energy density of lithium batteries, a mixture of at least two cathode active materials with different particle diameters or a cathode active material with 2 or more peaks in particle size distribution may be used to improve filling density of the cathode active material. However, the use of at least two cathode active materials having different particle diameters may impede thermal stability of the lithium battery due to the smaller particle-diameter cathode active material that has a relatively low thermal stability and a large specific surface area cathode active material.

Therefore, there is a demand for a lithium battery with high energy density and high thermal stability.

SUMMARY

One or more embodiments of the present disclosure include a composite cathode active material with high energy density and improved thermal stability.

One or more embodiments of the present disclosure include a cathode including the composite cathode active material.

One or more embodiments of the present disclosure include a lithium battery using the cathode.

Additional aspects will be set forth in part in the description which follows and, in part, will be apparent from the description, or may be understood by practice of the presented embodiments.

According to one or more embodiments of the present disclosure, a composite cathode active material includes at least one large-diameter active material selected from the group consisting of compounds represented by Formulae 1 to 4 below, and at least one small-diameter active material selected from the group consisting of compounds represented by Formulae 5 to 8 below:

$$Li_xCo_{1-y}M_yO_{2-\alpha}X_\alpha \quad \text{Formula 1}$$

$$Li_xCo_{1-y-z}Ni_yM_zO_{2-\alpha}X_\alpha \quad \text{Formula 2}$$

$$Li_xMn_{2-y}M_yO_{4-\alpha}X_\alpha \quad \text{Formula 3}$$

$$Li_xCo_{2-y}M_yO_{4-\alpha}X_\alpha \quad \text{Formula 4}$$

$$Li_aCo_{1-b}M_bO_{2-\alpha}X_\alpha \quad \text{Formula 5}$$

$$Li_aCo_{1-b-c}Ni_bM_cO_{2-\alpha}X_\alpha \quad \text{Formula 6}$$

$$Li_aMn_{2-b}M_bO_{4-\alpha}X_\alpha \quad \text{Formula 7}$$

$$Li_aCo_{2-b}M_bO_{4-\alpha}X_\alpha \quad \text{Formula 8}$$

wherein, in Formulae 1 to 8, $1.0 \leq x \leq 1.1$, $0 \leq y \leq 0.9$, $0 \leq z \leq 0.5$, $0 \leq \alpha \leq 2$, $0.80 \leq a \leq 0.95$, $0 \leq b \leq 0.9$, $0 \leq c \leq 0.5$; M is at least one element selected from the group consisting of aluminum (Al), nickel (Ni), manganese (Mn), chromium (Cr), iron (Fe), magnesium (Mg), strontium (Sr), vanadium (V), and a rare-earth element; and X is an element selected from the group consisting of oxygen (O), fluorine (F), sulfur (S), and phosphorus (P). In some embodiments, the large-diameter active material has an average particle diameter ($D_{50}$) of from about 5 μm to about 50 μm. In some embodiments, the small-diameter active material has an average particle diameter ($D_{50}$) of from about 0.1 μm to about 10 μm. In some embodiments, the composite cathode active material has a press density of about 3.31 g/cm³ or greater. In some embodiments, the large-diameter active material is represented by Formula 9 below, and the small-diameter active material is represented by Formula 10 below:

$$Li_xCo_{1-y-z}Ni_yMn_zO_2 \quad \text{Formula 9}$$

$$Li_aCo_{1-b-c}Ni_bMn_cO_2 \quad \text{Formula 10}$$

wherein, in Formulae 9 and 10, $1.01 \leq x \leq 1.05$, $0 \leq y \leq 0.9$, $0 \leq z \leq 0.5$, $0.85 \leq a \leq 0.94$, $0 \leq b \leq 0.9$, and $0 \leq c \leq 0.5$.

According to one or more embodiments of the present disclosure, a cathode includes a composite cathode active material as disclosed and described herein. In some embodiments, the large-diameter active material has an average particle diameter ($D_{50}$) of from about 5 μm to about 50 μm. In some embodiments, the small-diameter active material has an average particle diameter ($D_{50}$) of from about 0.1 μm to about 10 μm. In some embodiments, the composite cathode active material has a press density of about 3.31 g/cm³ or greater. In some embodiments, the large-diameter active material is represented by Formula 9 below, and the small-diameter active material is represented by Formula 10 below:

$$Li_xCo_{1-y-z}Ni_yMn_zO_2 \quad \text{Formula 9}$$

$$Li_aCo_{1-b-c}Ni_bMn_cO_2 \quad \text{Formula 10}$$

wherein, in Formulae 9 and 10, $1.01 \leq x \leq 1.05$, $0 \leq y \leq 0.9$, $0 \leq z \leq 0.5$, $0.85 \leq a \leq 0.94$, $0 \leq b \leq 0.9$, and $0 \leq c \leq 0.5$.

According to one or more embodiments of the present disclosure, a lithium battery includes a cathode as disclosed and described herein. In some embodiments, the large-diameter active material has an average particle diameter ($D_{50}$) of from about 5 μm to about 50 μm. In some embodiments, the small-diameter active material has an average particle diameter ($D_{50}$) of from about 0.1 μm to about 10 μm. In some embodiments, the composite cathode active material has a press density of about 3.31 g/cm³ or greater. In some embodiments, the large-diameter active material is represented by Formula 9 below, and the small-diameter active material is represented by Formula 10 below:

$$Li_xCo_{1-y-z}Ni_yMn_zO_2 \quad \text{Formula 9}$$

$$Li_aCo_{1-b-c}Ni_bMn_cO_2 \quad \text{Formula 10}$$

wherein, in Formulae 9 and 10, 1.01≤x≤1.05, 0≤y≤0.9, 0≤z≤0.5, 0.85≤a≤0.94, 0≤b≤0.9, and 0≤c≤0.5.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
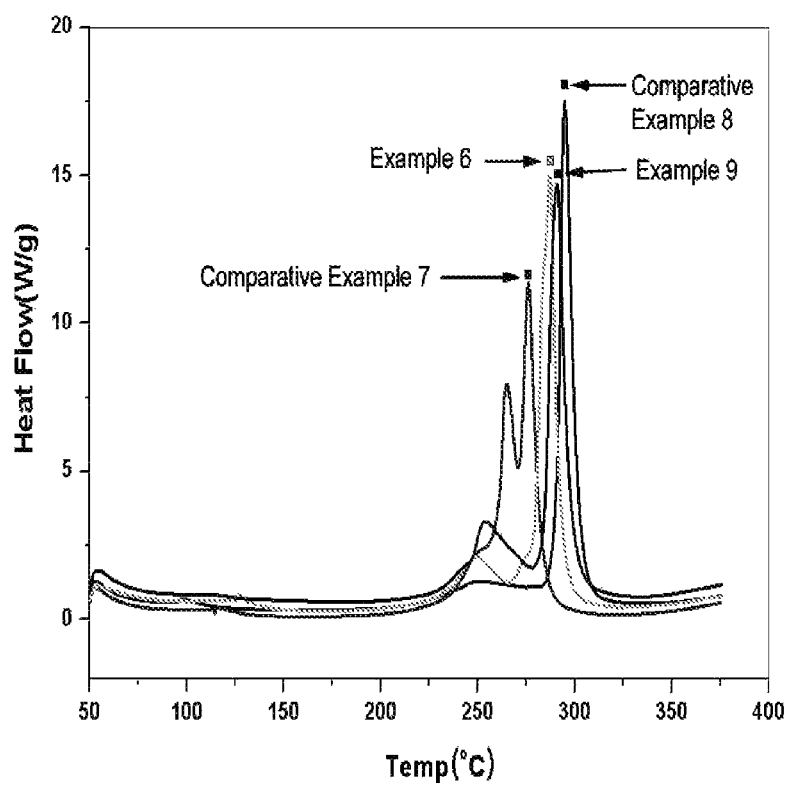
FIG. 1 is a graph illustrating the results of differential scanning calorimetry (DSC) on cathode active materials of Examples 6 and 9 and Comparative Examples 7 and 8.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments of a composite cathode active material, a cathode including the composite cathode active material, and a lithium battery including the cathode will be described in greater detail.

According to an embodiment of the present disclosure, a composite cathode active material may include at least one large-diameter active material selected from the group consisting of compounds represented by Formulae 1 to 4 below, and at least one small-diameter active material selected from the group consisting of compounds represented by Formulae 5 to 8 below.

   Formula 1

$Li_xCo_{1-y}M_yO_{2-\alpha}X_\alpha$

   Formula 2

$Li_xCo_{1-y-z}Ni_yM_zO_{2-\alpha}X_\alpha$

   Formula 3

$Li_xMn_{2-y}M_yO_{4-\alpha}X_\alpha$

   Formula 4

$Li_xCo_{2-y}M_yO_{4-\alpha}X_\alpha$

   Formula 5

$Li_aCo_{1-b}M_bO_{2-\alpha}X_\alpha$

   Formula 6

$Li_aCo_{1-b-c}Ni_bM_cO_{2-\alpha}X_\alpha$

   Formula 7

$Li_aMn_{2-b}M_bO_{4-\alpha}X_\alpha$

   Formula 8

$Li_aCo_{2-b}M_bO_{4-\alpha}X_\alpha$ wherein, in Formulae 1 to 8, 1.0≤x≤1.1, 0≤y≤0.9, 0≤z≤0.5, 0≤α≤2, 0.80≤a≤0.95, 0≤b≤0.9, 0≤c≤0.5; M is at least one element selected from the group consisting of aluminum (Al), nickel (Ni), manganese (Mn), chromium (Cr), iron (Fe), magnesium (Mg), strontium (Sr), vanadium (V), and a rare-earth element; and X is an element selected from the group consisting of oxygen (O), fluorine (F), sulfur (S), and phosphorus (P).

In some embodiments, a lithium battery densely filled with the composite active material including a mixture of large-diameter active material and small-diameter active material, may have improved energy density. In some embodiments, a lithium content of the large-diameter active material where x is 1 or greater and the content of the transition metal is less than the lithium content may increase electrical capacity of the lithium battery. In some embodiments, a lithium content of the small-diameter active material where x is less than 1 and the content of the transition metal is greater than the lithium content may improve thermal stability of the lithium battery.

In some embodiments, in the composite cathode active materials of Formulae 1 to 4, it may be satisfied that 1.01≤x≤1.05. In some other embodiments, in the composite cathode active materials of Formulae 1 to 4, it may be satisfied that 1.02≤x≤1.04. In some other embodiments, in the composite cathode active materials of Formulae 5 to 8, it may be satisfied that 0.85≤a≤0.94. In some other embodiments, in the composite cathode active materials of Formulae 5 to 8, it may be satisfied that 0.87≤a≤0.92.

In the above formulae of the composite cathode active materials, when x is greater than 1.05, an amount of residual lithium may be increased. In some embodiments, when x is less than 1.0, this may lead to reduced capacity. In the above formulae of the composite cathode active materials, when a is greater than 0.95, agglomeration of secondary particles may occur. In some embodiments, when a is less than 0.80, this may lead to reduced crystallinity.

In some embodiments, an amount of the large-diameter active material may be about 60 wt % or greater of the composite cathode active material. For example, an amount of the large-diameter active material may be about 70 wt % of the composite cathode active material. In some embodiments, an amount of the large-diameter active material may be about 75 wt % or more of the total weight of the composite cathode active material. In some embodiments, an amount of the large-diameter active material may be from about 60 wt % to about 99 wt % of the composite cathode active material. In some embodiments, an amount of the large-diameter active material may be from about 70 wt % to about 90 wt % of the composite cathode active material. In some embodiments, an amount of the large-diameter active material may be from about 75 wt % to about 85 wt % of the composite cathode active material.

In some embodiments, inclusion of a larger amount of the large-diameter active material in the composite cathode active material may lead to an increased electrical capacity of the lithium battery.

In some embodiments, an amount of the small-diameter active material may be about 40 wt % or less of the composite cathode active material. For example, an amount of the small-diameter active material may be about 30 wt % or less of the composite cathode active material. In some embodiments, an amount of the small-diameter active material may be about 25 wt % or less of the composite cathode active material. In some embodiments, an amount of the small-diameter active material may be from about 1 wt % to about 40 wt % of the composite cathode active material. In some embodiments, an amount of the small-diameter active material may be from about 10 wt % to about 30 wt % of the composite cathode active material. In some embodiments, an amount of the small-diameter active material may be from about 15 wt % to about 25 wt % of the composite cathode active material.

For example, an amount of the large-diameter active material may be from about 60 wt % to about 99 wt % of the composite cathode active material, and an amount of the small-diameter active material may be from about 1 wt % to about 40 wt % of the composite cathode active material. In some embodiments, the amount of the large-diameter active material may be from about 75 wt % to about 85 wt % of the composite cathode active material, and the amount of the small-diameter active material may be from about 15 wt % to about 25 wt % of the composite cathode active material. In some other embodiments, the amount of the large-diameter active material may be from about 72 wt % to about 83 wt % of the composite cathode active material, and the amount of the small-diameter active material may be from about 17 wt % to about 28 wt % of the composite cathode active material.

An average particle diameter (D50) ratio of the large-diameter active material to the small-diameter active material of the composite cathode active material may be from about 2:1 to about 20:1. In some embodiments, the composite cathode active material may have improved physical characteristics when the average particle diameter ratio of the large-diameter active material to the small-diameter active material is within this range.

For example, the large-diameter active material may have an average particle diameter ($D_{50}$) of from about 5 µm to about 50 µm. In some embodiments, the large-diameter active material may have an average particle diameter ($D_{50}$) of from about of from about 5 µm to about 50 µm. In some embodiments, the large-diameter active material may have an average particle diameter ($D_{50}$) of from about of from about 5 µm to about 45 µm. In some embodiments, the large-diameter active material may have an average particle diameter ($D_{50}$) of from about of from about 5 µm to about 40 µm. In some embodiments, the large-diameter active material may have an average particle diameter ($D_{50}$) of from about of from about 5 µm to about 35 µm. In some embodiments, the large-diameter active material may have an average particle diameter ($D_{50}$) of from about of from about 5 µm to about 30 µm. In some embodiments, the large-diameter active material may have an average particle diameter ($D_{50}$) of from about of from about 5 µm to about 25 µm. In some embodiments, the large-diameter active material may have an average particle diameter ($D_{50}$) of from about of from about 5 µm to about 20 µm. In some embodiments, the large-diameter active material may have an average particle diameter ($D_{50}$) of from about of from about 5 µm to about 15 µm. In some embodiments, the large-diameter active material may have an average particle diameter ($D_{50}$) of from about of from about 5 µm to about 10 µm. In some embodiments, the large-diameter active material may have an average particle diameter ($D_{50}$) of 5 µm, 10 µm, 15 µm, 20 µm, 25 µm, 30 µm, 35 µm, 40 µm, 45 µm, or 50 µm, or have an average particle diameter ($D_{50}$) in a range defined by any two of the preceding values. In some embodiments, the internal resistance may be increased when the average particle diameter of the large-diameter active material is larger than 50 µm. In some embodiments, smooth dispersion of the large diameter cathode active material in the cathode slurry composition may not be achieved when the average particle diameter of the large-diameter active material is smaller than 5 µm.

In some embodiments, the small-diameter active material has an average particle diameter ($D_{50}$) of from about 0.1 µm to about 10 µm. In some embodiments, the small-diameter active material has an average particle diameter ($D_{50}$) of from about of from about 0.1 µm to about 10 µm. In some embodiments, the small-diameter active material has an average particle diameter ($D_{50}$) of from about of from about 0.1 µm to about 9 µm. In some embodiments, the small-diameter active material has an average particle diameter ($D_{50}$) of from about of from about 0.1 µm to about 8 µm. In some embodiments, the small-diameter active material has an average particle diameter ($D_{50}$) of from about of from about 0.15 µm to about 7 µm. In some embodiments, the small-diameter active material has an average particle diameter ($D_{50}$) of from about of from about 0.1 µm to about 6 µm. In some embodiments, the small-diameter active material has an average particle diameter ($D_{50}$) of from about of from about 0.1 µm to about 5 µm. In some embodiments, the small-diameter active material has an average particle diameter ($D_{50}$) of from about of from about 0.1 µm to about 4 µm. In some embodiments, the small-diameter active material has an average particle diameter ($D_{50}$) of from about of from about 0.1 µm to about 3 µm. In some embodiments, the small-diameter active material has an average particle diameter ($D_{50}$) of from about of from about 0.1 µm to about 2 µm. In some embodiments, the small-diameter active material has an average particle diameter ($D_{50}$) of from about of from about 0.1 µm to about 1 µm. In some embodiments, the small-diameter active material has an average particle diameter ($D_{50}$) of from about of from about 0.1 µm to about 0.5 µm. In some embodiments, the small-diameter active material has an average particle diameter ($D_{50}$) of 0.1 µm, 0.5 µm, 1 µm, 1.5 µm, 2 µm, 2.5 µm, 3 µm, 3.5 µm, 4 µm, 4.5 µm, 5 µm, 5.5 µm, 6 µm, 6.5 µm, 7 µm, 7.5 µm, 8 µm, 8.5 µm, 9 µm, 9.5 µm, or 10 µm, or have an average particle diameter ($D_{50}$) in a range defined by any two of the preceding values. In some embodiments, the anti-corrosion effect may be trivial when the average particle diameter is larger than 10 µm. In some embodiments, smooth dispersion of the non-transition metal oxide in forming an electrode may not be achieved when the average particle diameter is smaller than 0.1 µm.

In some embodiments, the inclusion of the large-diameter active material and the small-diameter active material in a specific particle diameter ratio and in a specific weight ratio may improve volume density, and thus leading to further increased electrical capacity of a lithium battery.

In some embodiments, a press density of the composite cathode active material may be about 3.31 $g/cm^3$ or greater. In some embodiments, a press density of the composite cathode active material may be from about 3.4 $g/cm^3$ to about 4.0 $g/cm^3$. In some embodiments, volume density of the composite cathode active material may be too small to obtain a high electrical capacity when the press density of the composite cathode active material is less than 3.31 $g/cm^3$. In some embodiments, the volume density of the composite cathode active material may exceed a conventional density range, and the composite cathode active material may be broken if the press density of the composite cathode active material is greater than 4.0 $g/cm^3$.

In some embodiments, a press density of the large-diameter active material of the composite cathode active material may be from about 2.5 $g/cm^3$ to about 4.0 $g/cm^3$, and a press density of the small-diameter active material may be from about 1.0 $g/cm^3$ to about 4.0 $g/cm^3$. As used therein, the terms "press density" refer to an apparent press density when the composite cathode active material powder is pressed at a pressure of 2.5 $ton/cm^2$. In some embodiments, the mixture of the large-diameter active material and small-diameter active material may have a reduced press density when the press densities of the large-diameter active material and small-diameter active material are smaller than the lower limits of the above-mentioned density ranges. In some embodiments, high-rate discharge characteristics of the lithium battery may be deteriorated when the press densities of the large-diameter active material and small-diameter active material are greater than the upper limits of the above-mentioned density ranges.

In some embodiments, the large-diameter active material of the composite cathode active material may be represented by Formula 9 below, and the small-diameter active material may be represented by Formula 10 below:

$$Li_xCo_{1-y-z}Ni_yMn_zO_2 \quad \text{Formula 9}$$

$$Li_aCo_{1-b-c}Ni_bMn_cO_2 \quad \text{Formula 10}$$

wherein, in Formulae 9 and 10, $1.01 \leq x \leq 1.05$, $0 \leq y \leq 0.9$, $0 \leq z \leq 0.5$, $0.85 \leq a \leq 0.94$, $0 \leq b \leq 0.9$, and $0 \leq c \leq 0.5$.

Some embodiments provide a cathode including the composite cathode active material described above. In some embodiments, the cathode may be manufactured by molding a cathode active material composition including the composite cathode active material and a binder into a desired shape, or coating the cathode active material composition on a current collector such as a copper foil, an aluminum foil, or the like.

In particular, the composite cathode active material, a conducting agent, a binder, and a solvent are mixed to prepare the cathode active material composition. In some embodiments, the cathode active material composition may be directly coated on a metallic current collector to prepare a cathode plate. In some embodiments, the cathode active material composition may be cast on a separate support to form a cathode active material film, which may then be separated from the support and laminated on a metallic current collector to prepare a cathode plate. The cathode is not limited to the examples described above, and may be one of a variety of types.

In some embodiments, the cathode may further include any other conventional cathode active materials known in the art, in addition to the above-described composite cathode active material, provided that the other conventional cathode active material has at least one different technical feature, for example, in terms of composition, particle diameter, and the like, in comparison with the composite cathode active material.

In some embodiments, the conventional cathode active material may include at least one component selected from the group consisting of lithium cobalt oxide, lithium nickel cobalt manganese oxide, lithium nickel cobalt aluminum oxide, lithium iron phosphorous oxide, and lithium manganese oxide. The cathode active material is not limited to these examples, and may be any cathode active material available in the art.

In some embodiments, the cathode active material may be a compound selected from the group consisting of $Li_aA_{1-b}B^1{}_bD^1{}_2$ (where $0.90 \leq a \leq 1.8$, and $0 \leq b \leq 0.5$); $Li_aE_{1-b}B^1{}_bO_{2-c}D^1{}_c$ (where $0.90 \leq a \leq 1.8$, $0 \leq b \leq 0.5$, $0 \leq c \leq 0.05$); $LiE_{2-b}B^1{}_bO_{4-c}D^1{}_c$ (where $0 \leq b \leq 0.5$, $0 \leq c \leq 0.05$); $Li_aNi_{1-b-c}Co_bB^1{}_cD^1{}_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cD^1{}_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is selected from the group consisting of nickel (Ni), cobalt (Co), manganese (Mn), and combinations thereof; $B^1$ is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ is selected from the group consisting of oxygen (O), fluorine (F), sulfur (S), phosphorus (P), and combinations thereof; E is selected from the group consisting of cobalt (Co), manganese (Mn), and combinations thereof; $F^1$ is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; $I^1$ is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

In some embodiments, the compounds listed above as cathode active materials may have a surface coating layer (hereinafter, "coating layer"). Alternatively, in some embodiments, a mixture of a compound without having a coating layer and a compound having a coating layer, the compounds being selected from the compounds listed above, may be used. In some embodiments, the coating layer may include at least one coating element oxide, hydroxide, oxyhydroxide, oxycarbonate, or hydroxycarbonate. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. In some embodiments, the coating layer may be formed using any method that does not adversely affect the physical properties of the cathode active material when a compound of the coating element is used. For example, the coating layer may be formed by methods known to those of skill in the art such as a spray coating method, a dipping method, or the like.

Examples of the cathode active material are $LiNiO_2$, $LiCoO_2$, $LiMn_xO_{2x}$ (x=1, 2), $LiNi_{1-x}Mn_xO_2$ ($0 < x < 1$), $LiNi_{1-x-y}Co_xMn_yO_2$ ($0 \leq x \leq 0.5$, $0 \leq y \leq 0.5$), $LiFeO_2$, $V_2O_5$, TiS, and MoS.

In some embodiments, the conducting agent may be carbon black or graphite particulates, but is not limited thereto. Any material available as a conducting agent in the art may be used.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a binding agent in the art may be used.

Examples of the solvent are N-methyl-pyrrolidone, acetone, and water, but are not limited thereto. Any material available as a solvent in the art may be used.

The amounts of the cathode active material, the conducting agent, the binder, and the solvent used in the manufacture of the lithium battery are amounts generally used in the art. At least one of the conducting agent, the binder and the solvent may not be used according to the use and the structure of the lithium battery.

Some embodiments provide a lithium battery including a cathode containing the above-described cathode active material. In some embodiments, the lithium battery may be manufactured in the following manner.

First, a cathode is prepared according to the above-described cathode preparation method.

Next, an anode active material, a conducting agent, a binder, and a solvent are mixed to prepare an anode active material composition. In some embodiments, the anode active material composition may be directly coated on a metallic current collector and dried to prepare an anode plate. In some embodiments, the anode active material composition may be cast on a separate support to form an anode active material film, which may then be separated from the support and laminated on a metallic current collector to prepare an anode plate.

The anode active material is a compound that allows intercalation/deintercalation of lithium. Any material available as an anode active material in the art may be used. Non-limiting examples of the anode active material are a lithium metal, a lithium alloy, a carbonaceous material, graphite, and a mixture thereof.

In some embodiments, the conducting agent, the binder and the solvent used for the anode active material composition may be the same as those used for the cathode active material composition. In some embodiments, a plasticizer may be further added into the cathode active material composition and the anode active material composition to form pores in the electrode plates.

The amounts of the anode active material, the conducting agent, the binder, and the solvent are those levels that are generally used to the manufacture of a lithium battery known in the art. At least one of the conducting agent, the binder and the solvent may be omitted according to the use and the structure of the lithium battery.

Next, a separator to be disposed between the cathode and the anode is prepared. The separator may be any separator that is commonly used for lithium batteries. The separator may have low resistance to migration of ions in an electrolyte and have an excellent electrolyte-retaining ability. Examples of the separator are glass fiber, polyester, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

In some embodiments, a polymer resin, a filler, and a solvent may be mixed together to prepare a separator composition. In some embodiments, the separator composition then may be directly coated on an electrode, and then dried to form the separator. In some embodiments, the separator composition may be cast on a support and then dried to form a separator film, which may then be separated from the support and laminated on an electrode to form the separator.

In some embodiments, the polymer resin used to manufacture the separator may be any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate and a mixture thereof.

Next, an electrolyte is prepared.

In some embodiments, the electrolyte may be an organic electrolyte solution. In some embodiments, the electrolyte may be in a solid phase. Non-limiting examples of the electrolyte are lithium oxide and lithium oxynitride. Any material available as a solid electrolyte known in the art may be used. In some embodiments, the solid electrolyte may be formed on the anode by, for example, sputtering.

In some embodiments, the organic electrolyte solution may be prepared by dissolving a lithium salt in an organic solvent.

In some embodiments, the organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

In some embodiments, the lithium salt may be any material available as a lithium salt in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(SO_2C_xF_{2x+1})(SO_2C_yF_{2y+1})$ (wherein x and y are each independently a natural number of 1 to 20, respectively), LiCl, LiI and a mixture thereof.

Figure 2:
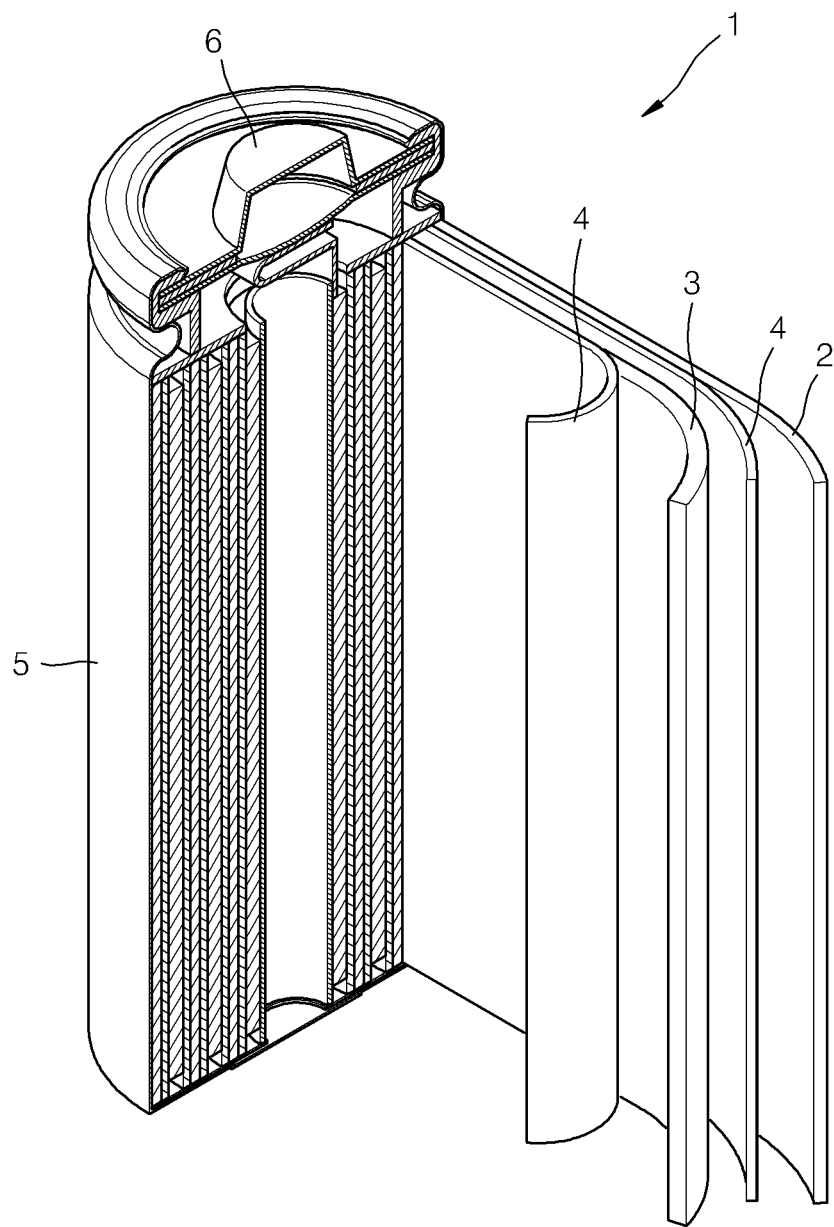
FIG. 2 is a schematic view of a lithium battery according to an embodiment.

Referring to FIG. 2, a lithium battery 1 includes a cathode 3, an anode 2, and a separator 4. In some embodiments, the cathode 3, the anode 2 and the separator 4 may be wound or folded, and then sealed in a battery case 5. In some embodiments, the battery case 5 may be filled with an organic electrolyte solution and sealed with a cap assembly 6, thereby completing the manufacture of the lithium battery 1. In some embodiments, the battery case 5 may be a cylindrical type, a rectangular type, or a thin-film type. For example, the lithium battery may be a thin-film type battery. In some embodiments, the lithium battery may be a lithium ion battery.

In some embodiments, the separator may be interposed between the cathode and the anode to form a battery assembly. In some embodiments, the battery assembly may be stacked in a bi-cell structure and impregnated with the electrolyte solution. The resultant product may be put into a pouch and hermetically sealed, thereby completing the manufacture of a lithium ion polymer battery.

In some embodiments, a plurality of battery assemblies may be stacked to form a battery pack, which may be used in any device that operates at high temperatures and requires high output. Examples of devices include, but are not limited to, a laptop computer, a smart phone, electric vehicle, and the like.

In some embodiments, the lithium battery may have high charge/discharge characteristics and improved high-temperature stability, and thus may be appropriate for use in an electric vehicle (EV), for example, in a hybrid vehicle such as plug-in hybrid electric vehicle (PHEV).

Hereinafter, exemplary embodiments of the present embodiments are described in detail with reference Examples. However the present embodiments are not limited to the Examples.

Preparation of Anode Active Material

Example 1

$Li_{1.03}Ni_{0.8}Co_{0.1}Mn_{0.1}O_2$ powder having an average particle diameter of about 15 μm and $Li_{0.9}Ni_{0.8}Co_{0.1}Mn_{0.1}O_2$ powder having an average particle diameter of about 5 μm were mixed in a weight ratio of about 95:5 to prepare a composite cathode active material.

Example 2

$Li_{1.03}Ni_{0.8}Co_{0.1}Mn_{0.1}O_2$ powder having an average particle diameter of about 15 μm and $Li_{0.9}Ni_{0.8}Co_{0.1}Mn_{0.1}O_2$ powder having an average particle diameter of about 5 μm were mixed in a weight ratio of about 90:10 to prepare a composite cathode active material.

Example 3

$Li_{1.03}Ni_{0.8}Co_{0.1}Mn_{0.1}O_2$ powder having an average particle diameter of about 15 μm and $Li_{0.9}Ni_{0.8}Co_{0.1}Mn_{0.1}O_2$ powder having an average particle diameter of about 5 μm were mixed in a weight ratio of about 85:15 to prepare a composite cathode active material.

Example 4

$Li_{1.03}Ni_{0.8}Co_{0.1}Mn_{0.1}O_2$ powder having an average particle diameter of about 15 μm and $Li_{0.9}Ni_{0.8}Co_{0.1}Mn_{0.1}O_2$ powder having an average particle diameter of about 5 μm were mixed in a weight ratio of about 80:20 to prepare a composite cathode active material.

Example 5

$Li_{1.03}Ni_{0.8}Co_{0.1}Mn_{0.1}O_2$ powder having an average particle diameter of about 15 μm and $Li_{0.9}Ni_{0.8}Co_{0.1}Mn_{0.1}O_2$ powder having an average particle diameter of about 5 μm were mixed in a weight ratio of about 75:25 to prepare a composite cathode active material.

Comparative Example 1

Only $Li_{1.03}Ni_{0.8}Co_{0.1}Mn_{0.1}O_2$ power having an average particle diameter of about 15 μm was used as a cathode active material.

Comparative Example 2

Only $Li_{0.90}Ni_{0.8}Co_{0.1}Mn_{0.1}O_2$ power having an average particle diameter of about 5 μm was used as a cathode active material.

Comparative Example 3

$Li_{1.03}Ni_{0.8}Co_{0.1}Mn_{0.1}O_2$ powder having an average particle diameter of about 15 μm and $Li_{1.03}Ni_{0.8}Co_{0.1}Mn_{0.1}O_2$ powder having an average particle diameter of about 5 μm were mixed in a weight ratio of about 80:20 to prepare a composite cathode active material.

Comparative Example 4

$Li_{0.90}Ni_{0.8}Co_{0.1}Mn_{0.1}O_2$ powder having an average particle diameter of about 15 μm and $Li_{0.9}Ni_{0.8}Co_{0.1}Mn_{0.1}O_2$ powder having an average particle diameter of about 5 μm were mixed in a weight ratio of about 80:20 to prepare a composite cathode active material.

Manufacture of Cathode and Lithium Battery

Example 6

A vessel containing 5 g of the composite cathode active material powder of Example 1, 0.15 g of a carbon conducting agent, and 0.15 g of polyvinylidene difluoride (PVDF) as a binder were mixed together to afford a mixture, and then 2.5 g of N-methypyrrolidone was added to the mixture. The resulting mixture was agitated using a mechanical stirrer for about 10 minutes to obtain slurry.

The slurry was coated on an aluminum (Al) current collector using a doctor blade, to a thickness of about 200 μm. The coated slurry was dried at room temperature, and then dried again under a vacuum at about 110° C., thereby preparing a cathode plate. The cathode plate was pressed into a sheet form using a roll press.

A coin cell (2016 type) of about 16 mm in diameter was manufactured using the cathode. In manufacturing the cell, metal lithium as a counter electrode, a polyethylene separator (Celgard® C2320, Celgard, LLC, Charlotte, N.C.) having a thickness of about 20 μm, and an electrolyte solution of 1.15M $LiPF_6$ dissolved in a mixed solvent of ethylenecarbonate (EC), ethylmethylcarbonate (EMC), and diethylcarbonate (DEC) in a 3:4:3 in volume ratio were used.

Example 7

A cathode and a lithium battery were manufactured in the same manner as in Example 6, except that the composite cathode active material powder of Example 2 was used.

Example 8

A cathode and a lithium battery were manufactured in the same manner as in Example 6, except that the composite cathode active material powder of Example 3 was used.

Example 9

A cathode and a lithium battery were manufactured in the same manner as in Example 6, except that the composite cathode active material powder of Example 4 was used.

Example 10

A cathode and a lithium battery were manufactured in the same manner as in Example 6, except that the composite cathode active material powder of Example 5 was used.

Comparative Example 5

A cathode and a lithium battery were manufactured in the same manner as in Example 6, except that the cathode active material powder of Comparative Example 1 was used.

Comparative Example 6

A cathode and a lithium battery were manufactured in the same manner as in Example 6, except that the cathode active material powder of Comparative Example 2 was used.

Comparative Example 7

A cathode and a lithium battery were manufactured in the same manner as in Example 6, except that the composite cathode active material powder of Comparative Example 3 was used.

Comparative Example 8

A cathode and a lithium battery were manufactured in the same manner as in Example 6, except that the composite cathode active material powder of Comparative Example 4 was used.

Evaluation Example 1

Press Density Measurement

Separately, 3 g of each of the composite cathode active materials of Examples 1 to 5 and Comparative Examples 1 to 4 was put into a mold having a diameter of about 1.2 cm, and then pressed at about 2.6 ton/cm² to obtain pellets. Densities of the pellets were measured. The results are shown in Table 1 below.

Evaluation Example 2

Discharge Capacity Evaluation

The lithium batteries prepared according to Examples 6 to 10 and Comparative Examples 4 to 8 were charged with a constant current at about 0.1 C rate at about 25° C. to a cut-off voltage of about 4.3V (with respect to Li electrode). After about 10-minute rest time, the fully charged cells were discharged with a constant current at about 0.1 C rate to a cut-off voltage of about 3.0V (with respect to Li electrode), thereby measuring discharge capacities. The results of the discharge capacity test are shown in Table 1 below.

Evaluation Example 3

Thermal Stability Evaluation

The lithium batteries manufactured in Examples 6 to 10 and Comparative Examples 4 to 8 were charged with a constant current at about 0.1 C rate at about 25° C. to a cut-off voltage of about 4.3V (with respect to Li), followed by constant voltage charging at a constant voltage of 4.3V until the current reached 0.05 C, and then constant current discharging at a constant current of 0.1 C until the voltage reached 1.5V (with respect to Li) (formation process).

After the formation process, each of the lithium batteries was charged at about 25° C. and a constant current of 0.5 C rate to a voltage of 4.3V (with respect to lithium metal), followed by constant voltage charging at a constant voltage of 4.3 C rate until the current reached 0.05 C.

Subsequently, after disassembling each of the charged coin cells, the cathode active material was extracted therefrom, and then analyzed using a differential scanning calorimeter (DSC). The analysis results are shown in Table 1 and FIG. 1.

TABLE 1

| | Press density [g/cm³] | Discharge capacity (mAh/g) | Maximum heat flow temperature [° C.] |
|---|---|---|---|
| Example 6 | 3.32 | 174.8 | 290 |
| Example 7 | 3.36 | 174.2 | 290 |
| Example 8 | 3.41 | 173.7 | 292 |
| Example 9 | 3.45 | 173.5 | 294 |
| Example 10 | 3.42 | 171.2 | 295 |
| Comparative Example 5 | 3.30 | 174.9 | 290 |
| Comparative Example 6 | 3.14 | 162.2 | 295 |
| Comparative Example 7 | 3.42 | 175.1 | 272 |
| Comparative Example 8 | 3.43 | 160.3 | 298 |

Referring to Table 1 above, the lithium battery of Comparative Example 5 including only the large-diameter active material had a low press density, and the lithium battery of Comparative Example 6 including only the small-diameter active material had a low discharge capacity. The lithium battery of Comparative Example 7 including the large-diameter active material with high-lithium content and the small-diameter active material with high-lithium content had relatively low thermal stability, and the lithium battery of Comparative Example 2 including the large-diameter active material with low-lithium content and the small-diameter active material with high-lithium content had a relatively low discharge capacity. The results in Table 1 show that the lithium battery of Comparative Examples 5 and 7 with a high energy density had low thermal stability, and the lithium batteries of Comparative Examples 6 and 8 with high thermal stability had low energy densities.

In contrast, the lithium batteries of Examples 6 to 10 each using a mixture of a high-lithium content large-diameter active material and a low-lithium content small-diameter active material had a press density of about 3.31 g/cm² or greater, a discharge capacity of about 171 mAh/g or greater, and a maximum heat flow temperature of about 290° C. or higher having simultaneously a high energy density and improved thermal stability.

As described above, according to one or more of the above embodiments of the present disclosure, using a mixture of a high-lithium content large-diameter active material and a low-lithium content small-diameter active material may lead to improved energy density and thermal stability of a lithium battery.

It should be understood that the exemplary embodiments described therein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from the spirit and scope of the present embodiments as defined by the following claims.

What is claimed is:

1. A composite cathode active material comprising at least one large-diameter active material represented by Formula 2 below:

$$Li_xCo_{1-y-z}Ni_yM_zO_{2-\alpha}X_\alpha;\quad\quad\text{Formula 2}$$

and
at least one small-diameter active material represented by Formula 6 below:

$$Li_aCo_{1-b-c}Ni_bM_cO_{2-\alpha}X_\alpha;\quad\quad\text{Formula 6}$$

wherein, in Formulae 2 and 6, 1.02≤x≤1.04, 0≤y≤0.9, 0≤z≤0.5, 0≤α≤2, 0.87≤a≤0.92, 0≤b≤0.9, 0≤c≤0.5; M is at least one element selected from the group consisting of aluminum (Al), nickel (Ni), manganese (Mn), chromium (Cr), iron (Fe), magnesium (Mg), strontium (Sr), vanadium (V), and a rare-earth element; and X is an element selected from the group consisting of oxygen (O), fluorine (F), sulfur (S), and phosphorus (P), wherein the content of the transition metal is greater than the content of the lithium content in the small-diameter active material in Formula 6 and the content of the transition metal is less than the content of the lithium content in the large-diameter active material in Formula 2.

2. The composite cathode active material of claim 1, wherein the large-diameter active material is from about 60 wt % to about 99 wt % of the composite cathode active material, and the small-diameter active material is from about 1 wt % to about 40 wt % of the composite cathode active material.

3. The composite cathode active material of claim 1, wherein the large-diameter active material is from about 75 wt % to about 85 wt % of the composite cathode active material, and the small-diameter active material is from about 15 wt % to about 25 wt % of the composite cathode active material.

4. The composite cathode active material of claim 1, wherein an average particle diameter (D50) ratio of the large-diameter active material to the small-diameter active material is from about 2:1 to about 20:1.

5. The composite cathode active material of claim 1, wherein the large-diameter active material has an average particle diameter ($D_{50}$) of from about 5 μm to about 50 μm.

6. The composite cathode active material of claim 1, wherein the small-diameter active material has an average particle diameter ($D_{50}$) of from about 0.1 μm to about 10 μm.

7. The composite cathode active material of claim 1, wherein the composite cathode active material has a press density of about 3.31 g/cm³ or greater.

8. The composite cathode active material of claim 1, wherein the large-diameter active material is represented by Formula 9 below, and the small-diameter active material is represented by Formula 10 below:

$Li_xCo_{1-y-z}Ni_yMn_zO_2$    Formula 9

$Li_aCo_{1-b-c}Ni_bMn_cO_2$    Formula 10 wherein, in Formulae 9 and 10, 1.02≤x≤1.04, 0≤y≤0.9, 0≤z≤0.5, 0.87≤a≤0.92, 0≤b≤0.9, and 0≤c≤0.5.

9. A cathode comprising the composite cathode active material of claim 1.

10. The cathode of claim 9, wherein an average particle diameter (D50) ratio of the large-diameter active material to the small-diameter active material is from about 2:1 to about 20:1.

11. The cathode of claim 9, wherein the large-diameter active material has an average particle diameter ($D_{50}$) of from about 5 μm to about 50 μm.

12. The cathode of claim 9, wherein the small-diameter active material has an average particle diameter ($D_{50}$) of from about 0.1 μm to about 10 μm.

13. The cathode of claim 9, wherein the large-diameter active material is represented by Formula 9 below, and the small-diameter active material is represented by Formula 10 below:

$Li_xCo_{1-y-z}Ni_yMn_zO_2$    Formula 9

$Li_aCo_{1-b-c}Ni_bMn_cO_2$    Formula 10 wherein, in Formulae 9 and 10, 1.02≤x≤1.04, 0≤y≤0.9, 0≤z≤0.5, 0.87≤a≤0.92, 0≤b≤0.9, and 0≤c≤0.5.

14. A lithium battery comprising the cathode of claim 9.

15. The lithium battery of claim 14, wherein an average particle diameter (D50) ratio of the large-diameter active material to the small-diameter active material is from about 2:1 to about 20:1.

16. The lithium battery of claim 14, wherein the large-diameter active material has an average particle diameter ($D_{50}$) of from about 5 μm to about 50 μm.

17. The lithium battery of claim 14, wherein the small-diameter active material has an average particle diameter ($D_{50}$) of from about 0.1 μm to about 10 μm.

18. The lithium battery of claim 14, wherein the large-diameter active material is represented by Formula 9 below:

$Li_xCo_{1-y-z}Ni_yMn_zO_2$    Formula 9 the small-diameter active material is represented by Formula 10 below:

$Li_aCo_{1-b-c}Ni_bMn_cO_2$    Formula 10 wherein, in Formulae 9 and 10, 1.02≤x≤1.04, 0≤y≤0.9, 0≤z≤0.5, 0.87≤a≤0.92, 0≤b≤0.9, and 0≤c≤0.5.

* * * * *